E. T. GOLDBERG & A. GALBORD.
MACHINE FOR ENLARGING RINGS.
APPLICATION FILED NOV. 13, 1915.

1,187,139.

Patented June 13, 1916.
2 SHEETS—SHEET 1.

WITNESSES:
H. A. Lamb.
M. T. Longden

INVENTORS
Elias T. Goldberg.
Aaron Galbord.
By
ATTORNEY

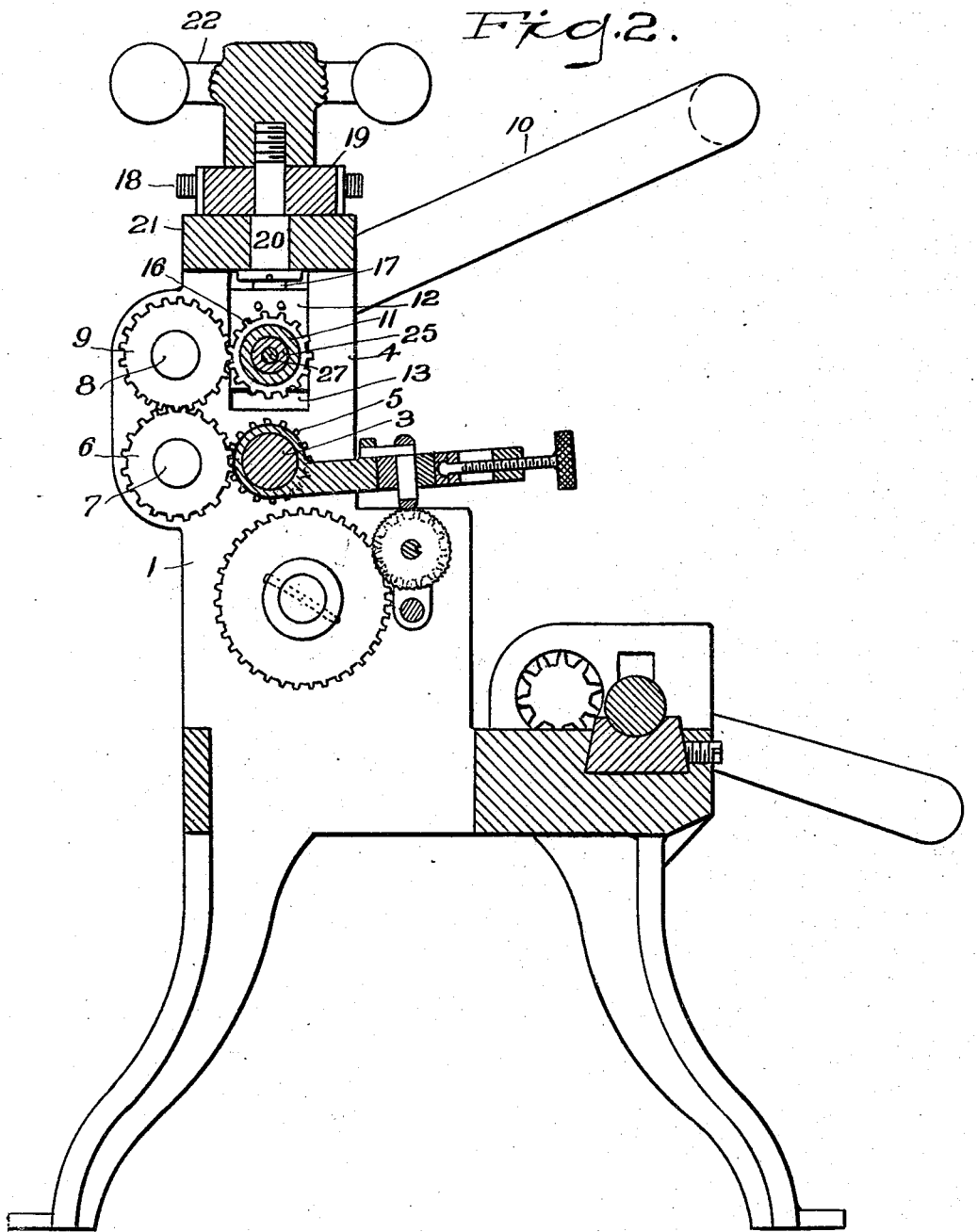

UNITED STATES PATENT OFFICE.

ELIAS T. GOLDBERG AND AARON GALBORD, OF BRIDGEPORT, CONNECTICUT.

MACHINE FOR ENLARGING RINGS.

1,187,139. Specification of Letters Patent. Patented June 13, 1916.

Application filed November 13, 1915. Serial No. 61,356.

*To all whom it may concern:*

Be it known that we, ELIAS T. GOLDBERG, a citizen of the United States of America, and AARON GALBORD, a subject of the Czar of Russia, both residing at Bridgeport, Fairfield county, Connecticut, have invented certain new and useful Improvements in Machines for Enlarging Rings, of which the following is a full, clear, and exact description of the invention, such as will enable others skilled in the art to which it appertains to make and use the same.

Our invention relates to certain improvements in machines for altering the sizes of rings and is particularly designed for the use of jewelers, either for the purpose of increasing or decreasing the sizes of rings, or for the purpose of initially bending and forming straight or partially bent bars or blanks into ring shape preparatory to soldering and polishing.

Our machine in its preferred form embodies in its construction instrumentalities for increasing the sizes of rings, for decreasing such sizes, and for bending and forming into a complete circlet partially formed rings or straight blanks that have previously been cut preparatory to shaping into ring form.

While we have shown in the accompanying drawings our machine fully equipped for performing these several operations above referred to, the present application will be confined to our invention only in so far as it is utilized for the purpose of enlarging the sizes of rings, while the means which we have shown for decreasing the sizes of rings and for shaping the partially formed rings or blanks for rings will be made the subjects of separate applications to be filed on even date herewith.

With these ends in view our invention consists in certain details of construction and combination of parts such as will be hereinafter described in detail and then particularly pointed out in the claims which conclude this description.

Figure 1:
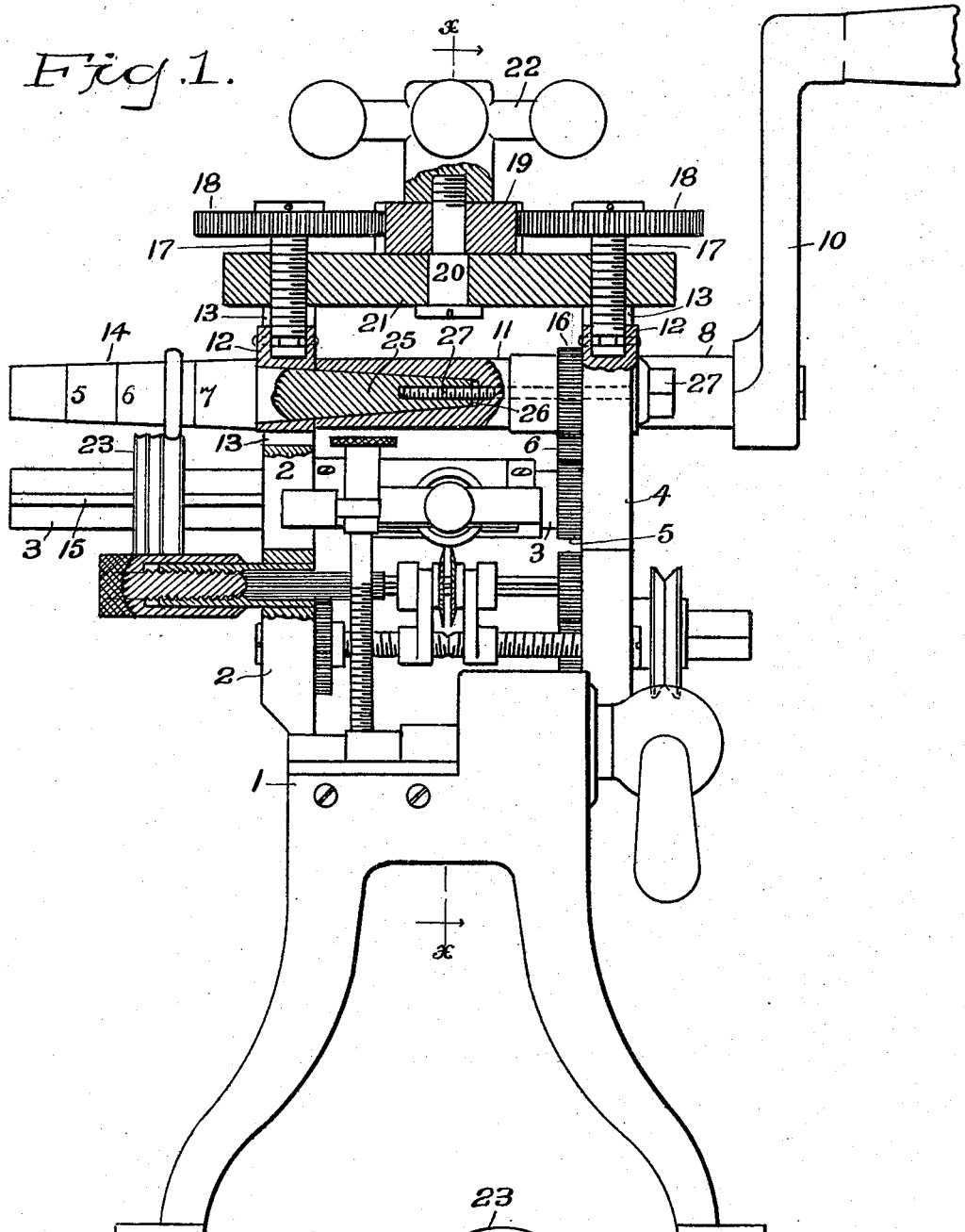
Figure 3:
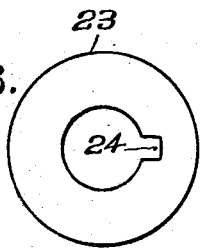

In the accompanying drawings Figure 1 is a front elevation, partly in section, of our preferred form of machine embodying our present improvement—Fig. 2 a vertical section on the line $x, x$, of Fig. 1, and Fig. 3 a detail elevation of one of the circular blocks.

Similar numerals of reference denote like parts in the several figures of the drawing.

1 is the frame of the machine, 3 is a shaft journaled within the uprights 2, 4, rising from said frame and projecting laterally beyond the upright 2, and 5 is a pinion tight on said shaft and meshing with an idle pinion 6 mounted on a short shaft 7 that is journaled in the upright 4.

8 is a crank shaft journaled in one of the uprights and carrying a rigid pinion 9 which is in mesh with the pinion 6, and 10 is any suitable crank applied to the shaft 8 whereby the latter may be revolved.

11 is a shaft which is journaled within blocks 12 that are contained within vertically disposed gates 13 in the uprights 2, 4, these blocks being capable of vertical movements within these gates. Secured to this shaft 11 and projecting laterally from the frame of the machine in substantial parallelism with the projecting portion of the shaft 3 is what is known as a "jewelers' stick" which we will designate by the numeral 14, and which bears around its tapered periphery a scale, while the projecting portion of the shaft 3 immediately below has throughout its length a key or spline 15 for the purpose presently to be explained.

Rigid on the shaft 11 is a pinion 16 which meshes with the pinion 9 on the crank shaft, so that it will be clearly understood that the revolution of the crank shaft will cause the stick 14 and the projecting portion of the shaft 3 to be revolved in opposite directions.

17 are screws which engage within suitable threaded perforations at the top of the uprights 2, 4, and lead into the gates 13, the lower extremities of these screws being attached to the blocks 12 in swiveled relation thereto, so that the action of these screws will cause these blocks to be elevated or lowered as the case may be. Secured to the upper or head portions of these screws immediately above the uprights 2, 4, are similar gears 18 which are in mesh with an intermediate gear 19 carried by a vertical short shaft 20 that is journaled within a cross bar 21 that bridges the upper ends of the uprights, and to this short shaft is secured any suitable handle or similar device 22 whereby this short shaft may be revolved for the purpose of elevating or lowering the blocks 12 and consequently the shaft 11 with its projecting stick portion 14. During the elevating or lowering of this shaft 11 by the action of the screws 17 the pinion 16 will not become disengaged from the pinion 9 owing to the limited movements of the blocks 12 so that the stick 14 will be revolved by the revolution of the crank shaft 8 at all times.

23 is a circular block which fits easily over the projecting portion of the shaft 3 and is provided with a key-way 24 within which extends the key 15 so that this block will be revolved by the shaft 3, and the periphery of this block has formed therein annular concave grooves of different widths to conform to the external contours of rings of different widths. Should the exterior contour of a ring be other than rounding, these grooves would, of course, be shaped accordingly so as to conform to the outer surface of the ring, and also as many of these blocks 23 may be employed as is found necessary according to the varieties in the outer contours of the rings.

The operation of our improvement is as follows:—The ring to be enlarged is placed upon the member 14 and a circular block 23 having the proper circumferential groove to conform to the outer surface of the ring is placed on the shaft 3 with its key-way 24 fitting in the key 15, and such block is moved along until said groove is beneath the ring, whereupon the handle 22 is operated to clamp the ring within the groove. It will, of course, be understood that the ring is wedged on the tapered shaft as far as possible by hand, and the size to which the ring is to be enlarged is denoted by the graduated scale on the member 14. The crank 10 is now turned, thereby revolving the block, the member 14 and the ring, the member 14 and the ring being revolved in a direction opposite to that in which the block is revolved. The handle 22 is from time to time operated as the ring is stretched or enlarged so as to keep such ring firmly clamped against the block whereby the latter, during the enlargement of the ring, will serve to perfectly shape the enlarged ring to the member 14, thus preventing any inaccuracies in the circlet. As the parts are revolving in the manner above described, the ring itself will slip around the member 14, this slipping being augmented by reason of the fact that the circular block has a diameter considerably greater than that of the ring itself, and the periphery of this block will therefore travel faster than the ring or the member 14 so that the ring will be dragged or forced around such member, and owing to the tapered nature of the latter a wedging action is constantly exerted against the inner surface of the ring which assists in the stretching thereof; but the action of the circular block on the different contours as they are presented exerts a continuous pulling action on the ring which results in the stretching or enlargement of the latter.

The above operation is preferably intermittently carried on by stopping the revolution of the crank and turning the handle to separate the ring and circular block, so that the latter may be still further wedged along the member 14 by the hand, whereupon the parts are restored to operative position and the crank is again turned, and this operation is continued until the ring is sufficiently enlarged so that it will readily slide along the member 14 up to the proper graduation on said member.

While we prefer that the block 23 shall be materially larger in diameter than the rings to be treated, since the desired result is more readily accomplished, nevertheless, this block might be as small in diameter as the rings or even smaller, but this would necessitate the application of greater power on the crank and would consume much more time.

The stick 14 is preferably so secured to the shaft 11 as to be interchangeable with other similar sticks of different sizes and bearing corresponding graduations, and to this end said stick is provided with a tapered tang 25 which is drawn snugly within a tapered recess 26 in the shaft 11 by means of a screw 27 driven through the outer end of said shaft into such tang.

As we have stated before, the drawings show three distinct sets of instrumentalities which can all be used independent of each other, and therefore we have made them the subjects of several applications filed on even date, but our commercial machine includes in its organization all three of these sets of instrumentalities because in this form it is far more serviceable since a jeweler does not care to have a multiplicity of machines for performing operations that are so closely allied as the enlarging, reducing and shaping of rings.

We claim:—

1. A machine of the character described, comprising a rotary tapered member which conforms to the inner surfaces of rings of various sizes, a rotary straight shaft in substantial parallelism to said member, a circumferentially grooved removable block carried by said straight shaft and revolving therewith, means for revolving said member and shaft simultaneously, and means for varying the space between said member and shaft.

2. A machine of the character described, comprising a frame, uprights rising from said frame, a rotary straight shaft journaled within said uprights and having a lateral projection extending beyond one of said uprights, a circumferentially grooved block slidably disposed on the projecting portion of said shaft and revolving therewith, blocks capable of vertical adjustments and contained within said uprights, a rotary shaft journaled within said blocks and having rigid therewith a tapered member that is in substantial parallelism with said lateral projection, means for revolving said shafts simultaneously, and means for adjusting said blocks to vary the space between said shafts.

3. A machine of the character described, comprising a rotary tapered member which conforms to the inner surfaces of rings of various sizes, a rotary circumferentially grooved block slidably supported in spaced relation to said member, means for revolving said member and block, and means for varying said spaced relation.

4. A machine of the character described, comprising a suitable frame, a pair of blocks slidably disposed within said frame, a rotary shaft journaled in said blocks and terminating in a projecting scale bearing tapered member which conforms to various sizes of rings, a rotary shaft journaled in said frame and having a projecting portion substantially parallel to said member and spaced therefrom, means for revolving said shafts simultaneously, a circular circumferentially grooved block slidably carried by the shaft that is journaled in the frame and revolving therewith, and means for simultaneously sliding said journal blocks in either direction whereby a closer or more distant relation is established between said member and grooved block.

In testimony whereof, we affix our signatures in presence of two witnesses.

ELIAS T. GOLDBERG.
AARON GALBORD.

Witnesses:
F. W. SMITH, Jr.,
M. T. LONGDEN.

Copies of this patent may be obtained for five cents each, by addressing the "Commissioner of Patents, Washington, D. C."